United States Patent [19]

Suzuki

[11] Patent Number: 4,876,619
[45] Date of Patent: Oct. 24, 1989

[54] DISK CARTRIDGE HAVING SHUTTER AND A DEVICE FOR OPENING AND CLOSING THE SHUTTER

[75] Inventor: Masayuki Suzuki, Kanagawa, Japan

[73] Assignee: Sony Corporation, Tokyo, Japan

[21] Appl. No.: 300,242

[22] Filed: Jan. 23, 1989

Related U.S. Application Data

[63] Continuation of Ser. No. 86,729, filed as PCT JP86/00597 on Nov. 21, 1986, published as WO87/03414 on Jun. 4, 1987, abandoned.

[30] Foreign Application Priority Data

Nov. 22, 1985 [JP] Japan .............................. 60-180502[U]

[51] Int. Cl.⁴ ...................... G11B 5/012; G11B 23/03
[52] U.S. Cl. ................................. 360/97.01; 360/133; 369/291
[58] Field of Search ................... 360/97.01, 99.01, 133; 369/291, 273; 206/444, 312

[56] References Cited

U.S. PATENT DOCUMENTS 4,543,619  9/1985  Pastor ..................................... 360/97
4,546,397 10/1985  Asami et al. ........................... 360/97
4,604,666  8/1986  Kitahara et al. ..................... 360/133
4,660,118  4/1987  Faber ................................... 360/133
4,685,010  8/1987  Tronzano ........................... 360/99 X
4,688,123  8/1987  Sokol et al. ............................ 360/97
4,688,206  8/1987  Nakagawa et al. ................. 369/291

FOREIGN PATENT DOCUMENTS 3503872  8/1985  Fed. Rep. of Germany .
0140570  9/1983  Japan .
0171771 10/1983  Japan ................................... 360/133
0145760  9/1984  Japan .
0227064 12/1984  Japan ................................... 360/133
2155233  9/1985  United Kingdom .

Primary Examiner—Robert S. Tupper
Assistant Examiner—Andrew L. Sniezek
Attorney, Agent, or Firm—Hill, Van Santen, Steadman & Simpson

[57] ABSTRACT

Disk cartridge (1) having a shutter (9) that slides only on one side of a cartridge (5) to open or close the openings (7) and (8) where there are disposed pick-up devices (44) that are located on the upper and lower surfaces of the cartridge (5) to read or rewrite signals, the cartridge (5) holding a disk (6) which can record data signals on both sides thereof, such as an optical disk. The invention further relates to a device for opening and closing the shutter of the cartridge (1) in which a pair of shutter opening/closing arms (51) and (52) are disposed facing the direction for inserting the disk cartridge (1), in order to open or close the shutter (9) of the disk cartridge (1). A protuberance (57) or (58) is brought into engagement with an engaging hole (29) of the shutter (9), whereby the arm (51) or (52) is turned as the cartridge (1) is inserted, and the shutter (9) slides to open the openings (7) and (8). When the disk cartridge (1) is improperly inserted, the protuberance (57) or (58) is not engaged with the engaging hole (29), whereby the disk cartridge that is improperly inserted is detected.

8 Claims, 11 Drawing Sheets

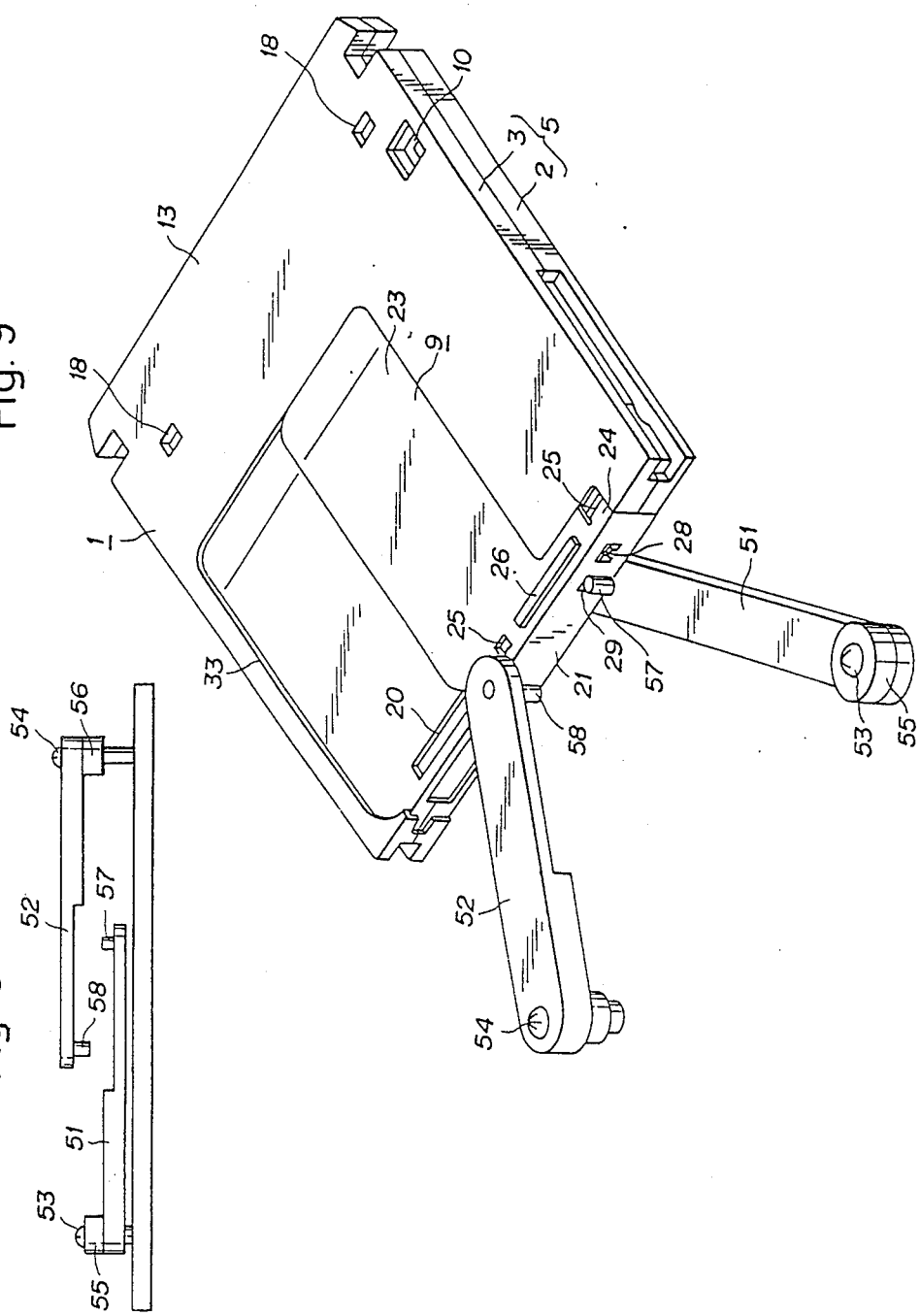

DISK CARTRIDGE HAVING SHUTTER AND A DEVICE FOR OPENING AND CLOSING THE SHUTTER

This is a continuation of application Ser. No. 086,729, filed as PCT JP86/00597 on Nov. 21, 1986, published as WO87/03414 on Jun. 4, 1987, now abandoned.

TECHNICAL FIELD

This invention relates to a disk cartridge having a shutter and a shutter opening and closing device for the disk cartridge, said shutter being movably mounted to the cartridge for opening or closing signal read-out or signal write apertures formed on the upper and lower sides of a cartridge containing a disk such as an optical disk or an opto-magnetic disk.

BACKGROUND ART

In the conventional practice, the optical disk or the magnetic disk used as the signal recording medium of the recording and/or reproducing apparatus is contained in a cartridge and attached to the recording and/or reproducing apparatus as it is contained in the cartridge, thereby to protect the signal recording surface. A disk cartridge consisting of the cartridge and the disk contained therein is provided on the upper and lower sides thereof with a pickup device, such as an optical pickup device, adapted for reading or writing information signals for recording and/or reproduction. The disk cartridge is also provided with a slidable shutter for closing the apertures except when it is attached to the recording and/or reproducing apparatus, in order to prevent dust deposition on or injury to the disk contained in the cartridge.

For this reason, the recording and/or reproducing apparatus such as the disk player, making use of this type of the disk cartridge, is provided with a shutter opening and closing device.

It will be noted that, in the recording and/or reproducing apparatus making use of the aforementioned disk cartridge as the signal recording medium, reading or writing of the information signals becomes possible only when the disk cartridge is correctly inserted into the apparatus, the shutter is actuated by the shutter opening and closing device to open the signal read and write apertures, and the pickup device confronts the disk through these apertures. Reading or writing the information signal becomes impossible when the disk cartridge is attached in the recording and/or reproducing apparatus without the shutter being completely opened by the shutter opening and closing device. In a disk cartridge wherein insertion openings for the disk table of the disk rotation drive device and the pressor for pressing and supporting the disk against the disk table are formed contiguously to the signal read or write apertures so as to be covered by the shutter, it becomes impossible to chuck the disk contained in the cartridge to the disk rotation drive unit for driving the disk into rotation, unless the shutter is opened completely.

It is therefore an object of the present invention to provide a shutter opening and closing device that enabled the shutter to be opened only when the disk cartridge is inserted correctly, while also enabling the disk cartridge to be attached in position in the recording and/or reproducing apparatus when the shutter is opened completely, and a disk cartridge having a shutter that is opened and closed by the shutter opening and closing device.

It is another object of the present invention to prevent improper insertion or attachment of the disk cartridge for protecting the disk cartridge, the pickup device provided in the recording and/or reproducing apparatus, the disk rotation drive device or the disk chucking mechanism.

DISCLOSURE OF THE INVENTION

This invention provides a shutter opening and closing device for a disk cartridge wherein signal read out or signal write apertures are formed on the upper and lower surfaces of a cartridge containing a disk, a shutter is provided so as to overlie the upper and lower sides as well as the front lateral sides of said cartridge and adapted for opening or closing said apertures, an engaging hole is provided to a portion of the front wall of said shutter, and wherein a pair of shutter opening and closing arms are provided facing the direction for inserting said disk cartridge, said shutter opening and closing arms having protuberances selectively engaging with said engaging hole and adapted to be turned by abutment by said disk cartridge, and an arrangement in which a recess into which the protuberance of the other shutter opening and closing arm that is not engaged in the engaging hole in the shutter at the time of proper insertion of the disk cartridge is engaged is provided to the front wall section of the disk cartridge.

The present invention is so designed and arranged that one of a pair of the shutter opening and closing arms is selected in dependence upon which side of the disk cartridge of the so-called one side opening type having a double usable side shutter is to face the pickup device. The protuberance provided for the one shutter opening and closing arm is engaged in the engaging hole provided for the shutter opening and closing arm for turning the shutter opening and closing arm to slide the shutter for opening the apertures. When the disk cartridge is inserted correctly, the protuberance provided for the other shutter opening and closing arm, which is not contributing to the opening and closure of the shutter, is caused to descend into the recess provided in the front wall section of the cartridge for turning the arm pair to the normal rotational position to cause complete opening of the shutter. When the disk cartridge is inserted incorrectly and the shutter opening operation is not performed at least completely, at least the protuberance of the other shutter opening and closing arm abuts on the stopper without intruding into the recess of the cartridge to inhibit the turning of the arm pair to their regular rotary positions.

BRIEF DESCRIPTION OF THE DRAWINGS

FIG. 8 is a end view showing the first and second shutter opening and closing arms.

FIG. 9 is a perspective view showing the disk cartridge abutting on and engaging with the first and second shutter opening and closing arms.

BEST MODE OF PRACTICING THE INVENTION

Figure 1:
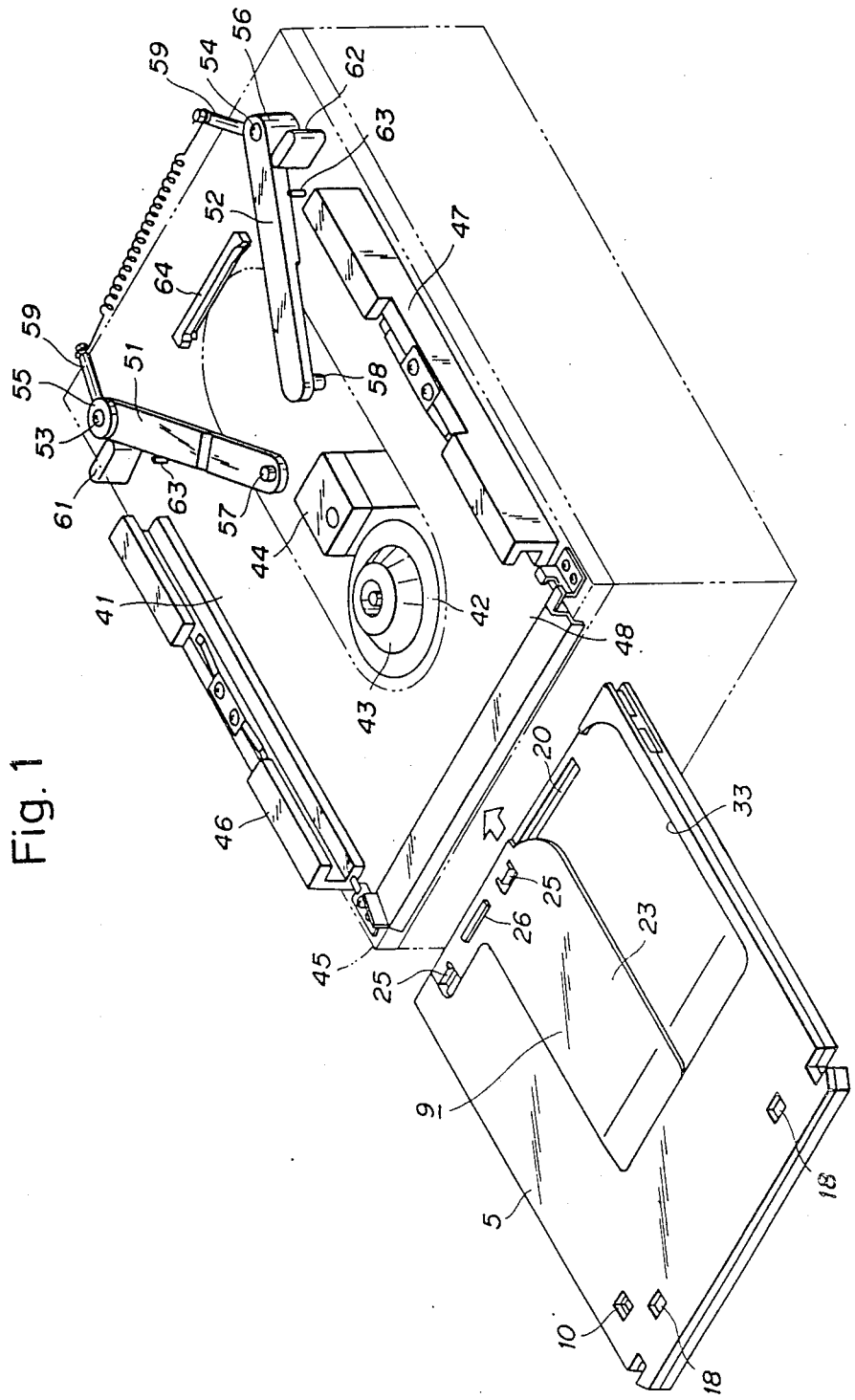
FIG. 1 a perspective view showing the shutter opening and closing device of the disk cartridge according to the present invention.

The present invention will be hereafter described by referring to the drawings showing illustrative embodiments thereof.

DISK CARTRIDGE STRUCTURE
(FIG. 2, 3, 4, 5 and 6)

A disk cartridge 1 applied to the present invention will be described first.

Figure 2:
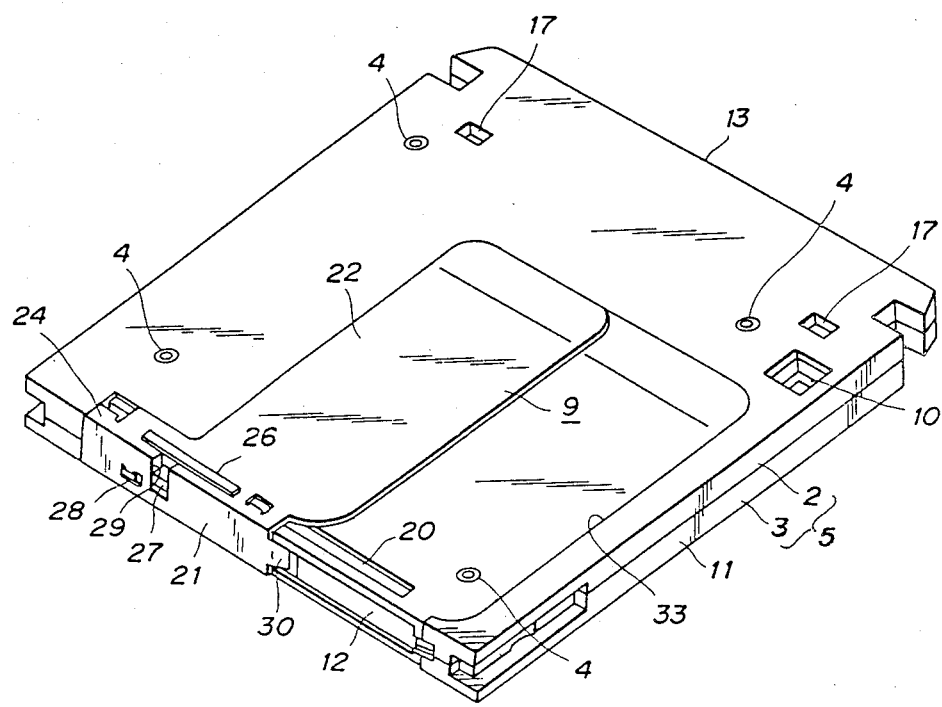
FIG. 2 is a perspective view from above of the disk cartridge according to the present invention, with the shutter being closed.
Figure 3:
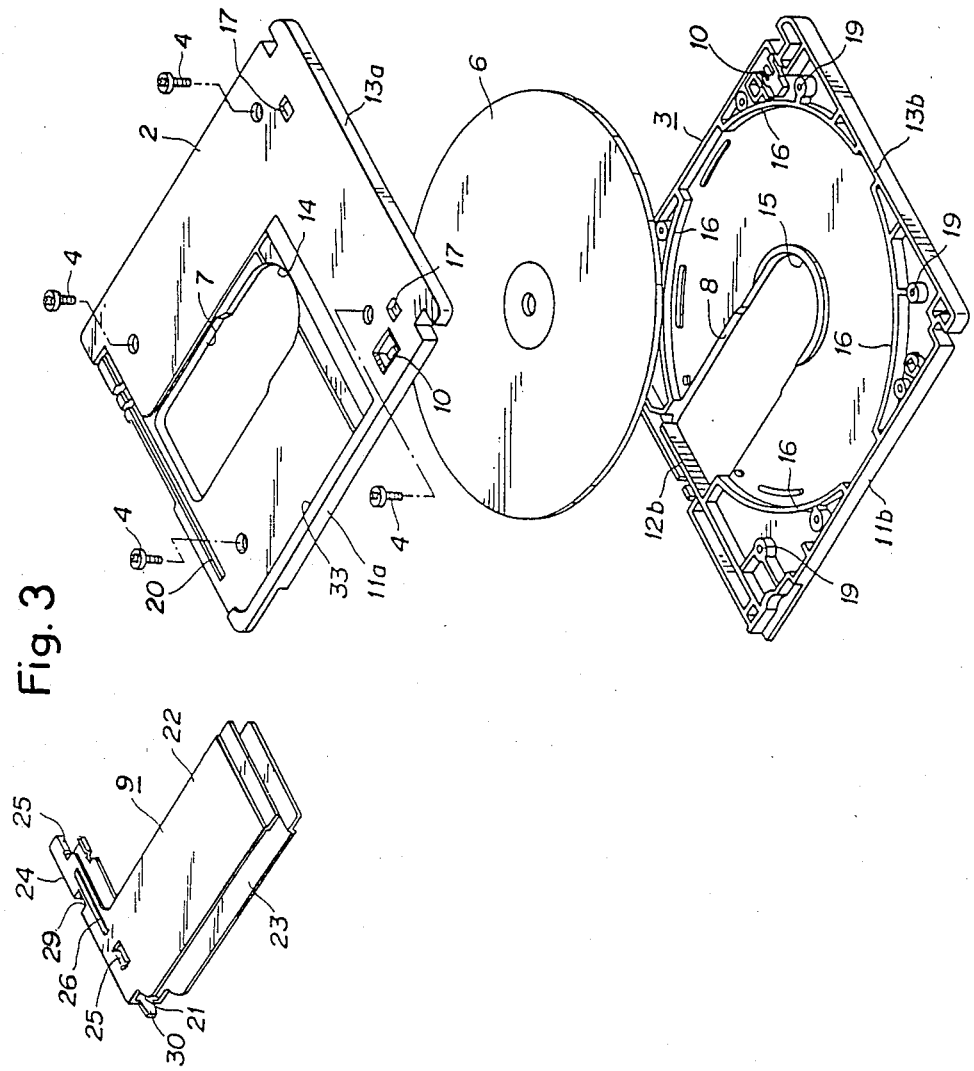
FIG. 3 is an exploded perspective view of the disk cartridge.
Figure 4:
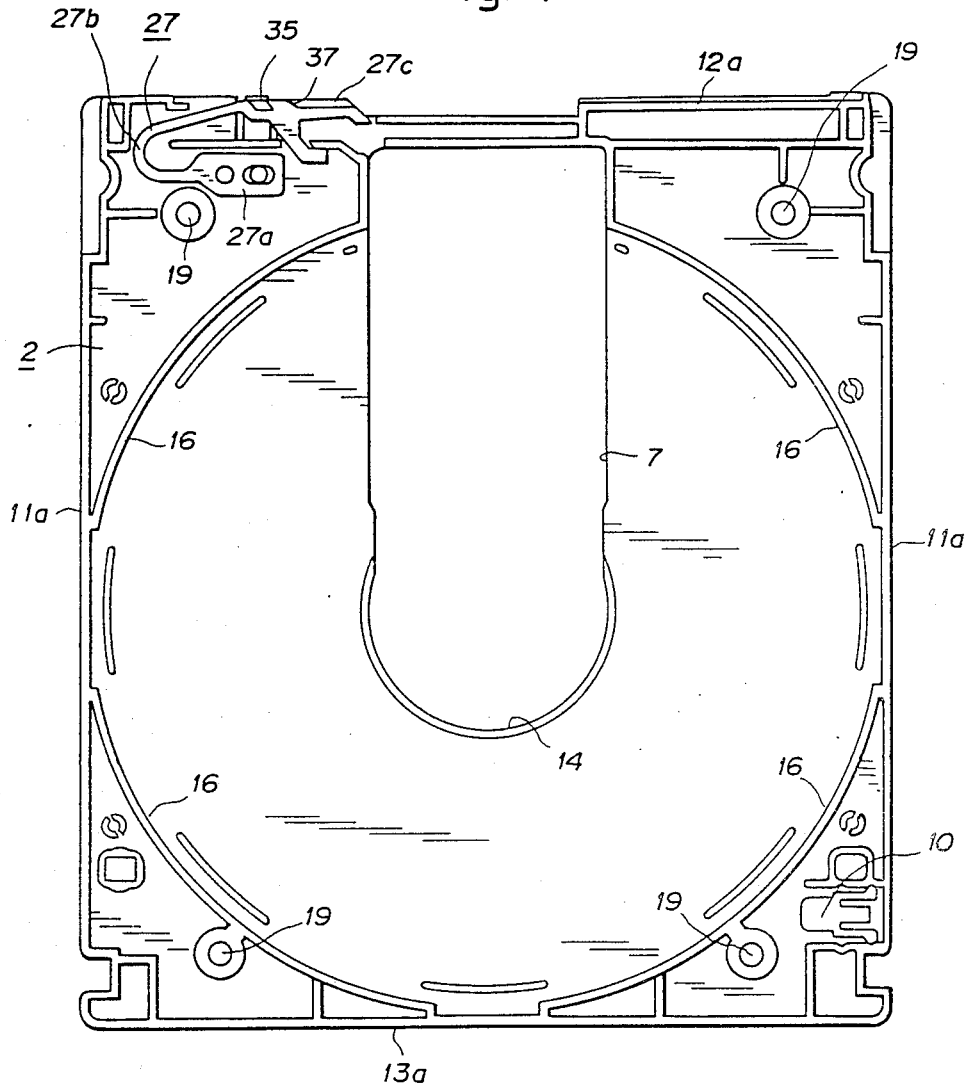
FIG. 4 is a plan view showing the inner side of the upper half of the disk cartridge.
Figure 5:
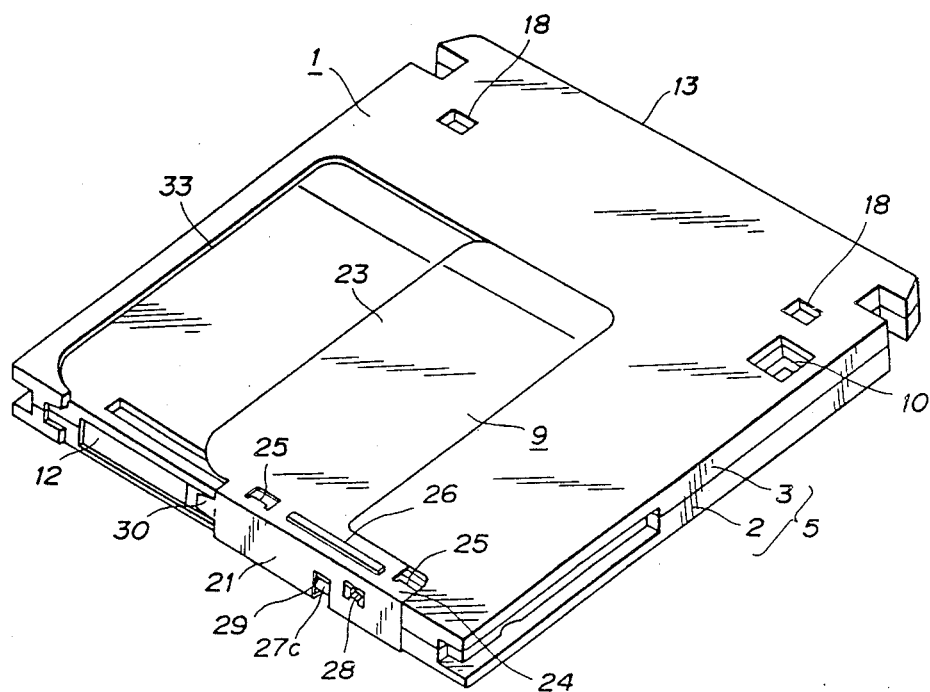
FIG. 5 is a perspective view from below of the disk cartridge.

As shown in FIGS. 2 and 3, the disk cartridge 1 comprises a cartridge 5 composed of substantially flat plate-like rectangular upper and lower halves 2 and 3 formed of synthetic resin as by molding and are secured in abutment to each other by a plurality of screws 4. A a circular disk 6, such as an opto-magnetic disk, is rotatably accommodated within the cartridge 5 and has signal recording sides on both surfaces thereof; and a shutter 9 is slidably mounted to the cartridge 5 and is adapted for opening or closing signal read out or write apertures 7, 8 provided in the upper half 2 and the lower half 3 of the cartridge 5, these apertures being confronted by an optical pickup adapted for writing or reading the signals to and from the disk 6. The disk cartridge 1 is designed as being of the double usable side type.

The upper half 2 and the lower half 3 of the cartridge 5 are formed symmetrically to each other except that write inhibit members 10 for inhibiting the writing into the disk 6 are provided at the same position so that these inhibit members 10 are in opposite positions to each other when the halves 2 and 3 are brought into abutting engagement with each other. The upper and lower halves 2, 3 are so designed that a space sufficient to accommodate the disk 6 for rotation is defined between these halves when the latter are abuttingly connected to each other. On the perimeter of these upper and lower halves 2 and 3, there are formed upright walls 11a, 11b, 12a, 12b, 13a and 13b defining left and right side wall section 11, 11, a front side wall section 12, and a rear side wall section 13. At the center of the upper and lower halves 2 and 3, there are formed disk table insertion apertures 14, 15 that are confronted by a disk table of a disk drive unit which is designed to drive the disk 6 contained in the cartridge 5 into rotation and which is provided formed a recording and/or reproducing apparatus. The aforementioned apertures 7, 8 are formed radially of the disk 6 as continuation to the insertion apertures 14 and 15 and with the same width as the diameters of the insertion apertures 14 and 15. In the inner sides of the upper and lower halves 2 and 3, plural arcuate ribs 16 are projectedly formed on a circumference of a circle slightly larger than the outside diameter of the disk 6 and centered about the disk table insertion apertures 14 and 15, such that, when the ribs 16 are abutted to each other, these ribs define a disk container while also delimiting position control wall means adapted to control the horizontal position of the disk 6.

Reference apertures 17 (FIG. 2), 18 (FIG. 5) are formed at both corners of the rear wall sections 13 opposite to the front wall sections 12 of the upper and lower halves 2 and 3 associated with the shutter 9. These reference apertures are adapted to receive positioning pins of the recording and/or reproducing apparatus when the disk cartridge 1 is attached thereto for positioning the disk cartridge with respect to the recording and/or reproducing apparatus. Towards the rear side of the upper and lower halves 2 and 3 in the vicinity of the reference apertures 17, 17, 18, 18, and within the area delimited by portions of the upright walls 11a, 11b, 12a, 12b, 13a and 13b at the corners of the halves 2 and 3 that are associated with the shutter 9 and the circular ribs 16, there are provided pairs of tapped bosses 19, 19; 19, 19 for set screws 4 adapted for securing the upper and lower halves 2 and 3 to each other.

On the outer sides along the front sides of the upper and lower halves 3 provided with the apertures 7 and 8, there are formed slide guide slots 20 for guiding the shutter 9 adapted for opening and closing the apertures 7 and 8.

The shutter 9 (FIGS. 2 and 3), which is slidably mounted by the slide guide slots 20 mounted in opposition to each other on both upper and lower sides of the cartridge 5, is fabricated in the form of a letter U from a metal sheet such as a stainless steel sheet. The shutter 9 is composed of a front wall as a connecting web and upper and lower shutter plates 22, 23 which are bent integrally from the connecting web and have a size sufficient to cover the apertures 7, 8, 14 and 15 simultaneously. The front side wall 21 and portions thereof connecting to the upper and lower shutter plates 22, 23 make up a slide guide section 24 for the cartridge 5. The section 24 is extended further from the side edges of the plates 22, 23 along the slide guide slots 20. In such manner, the shutter 9 is substantially L-shaped in a plan view.

On the upper and lower sides of the slide guide section 24 of the shutter 9, guide tabs 25, 25 are formed facing toward each other so as to be engaged with and guided by the guide slots 20, and these guide tabs are formed by partially cutting the section 24 and bending the partially cut portion inwards. Between the guide tabs 25, 25, a rib 26 is formed by drawing in order to prevent flexure of the guide section 24 in the direction of the thickness thereof otherwise caused by the provision of the slide guide section 24 longer than the width of the upper and lower shutter plates 22 and 23.

Towards one end of the front side wall 21 of the shutter 9, there is formed a bend or projection 28 by partial cutting and bending. The bend 28 is adapted to engage with a locking member 27 provided to the cartridge 5 when the shutter 9 is at a first position of closing the apertures 7 and 8. An engaging hole 29 is provided in the shutter 9 for extending from the front side wall 21 towards the upper shutter plate 22 as shown in FIG. 2. Into the engaging hole 29 is selectively engaged a shutter opening and closing pin which is a protuberance provided to each end of a pair of shutter opening and closing arms provided for the recording and/or reproducing apparatus. This hole 29 is an L-shaped cut-out extending from the front wall 21 towards the upper shutter plate 22 such that the shutter opening and closing pin provided for the shutter opening and closing arm is engaged in the cut-out orthogonally to the thickness of the disk cartridge 1. The engaging hole 29 is situated away from the center in the left-to-right direction of the cartridge 5 when the shutter 9 is at a first position of closing the aperture 7, 8 and the table insertion apertures 14, 15 such that the hole 29 is confronted by a projection 27c (see FIGS. 4 and 5) that is provided towards, the free end of the locking member 27 provided in turn at one corner at the front side of the cartridge 5. At the other extreme end of the front wall 21 opposite to the side of the shutter 9 provided with the engaging hole 29, an inwardly bent inclined guide 30 (see FIG. 2) is provided in order that the shutter opening and closing pin that is not used for opening or closing the shutter 9 at the time of insertion of the disk cartridge 1 may easily evade by riding on the front wall 21.

The shutter 9 described above is attached so as to overlie the front side wall section 12 from the upper sides of the upper and lower halves 2, 3 of the cartridge 5, such that the shutter may slide freely by being guided along the slide guide slots 20 of the cartridge 5 engaged by the guide tabs 25, 25. On the front side wall section 12 of the cartridge 5, to which the shutter 9 is mounted for sliding as described above, there is formed a recess 31 (see FIG. 6) to permit the passage of the bend 28 and the protuberance of the shutter opening and closing arm. A step 32 is formed at the lower half side portion of the recess 31 such that the projection implanted on the shutter opening and closing arm will be intruded for engaging with the engaging hole 29 of the shutter 9. The step 32 is formed with a depth sufficient for the shutter opening and closing pin to be embedded therein and is so designed that when the shutter opening and closing pin is intruded to the step 32 through the engaging hole 29, the pin is not protruded partially from the front wall 21 of the shutter 9.

A recess 33 is formed along the perimeter of the disk insertion openings 14, 15 and the apertures 7, 8 formed on the upper and lower surface of the cartridge 5 and along one side of these apertures 7, 8 and opening 14, 15, that is, the side opposite to that where the slide guide section 24 of the shutter 9 is not projected. The shutter 9 is movable within the extent of the recess 33 and between a first position shown in FIG. 2 wherein the apertures 7, 8 and the disk table insertion openings 14, 15 are closed by the shutter and a second position shown in FIG. 6 wherein these apertures 7, 8 and the openings 4, 15 are thereby opened.

At one inside corner at the front surface side of the upper half 2 of the disk cartridge 1, there is provided the locking member 27 (see FIG. 4) formed of a synthetic material and having a locking recess 35 in which the bend 28 is engaged for locking the shutter 9 when the shutter 9 is at the first position of closing the apertures 7, 8 and the disk table insertion openings 14, 15. Halfway on one lateral side of the locking member 27 extending from an attachment end 27a towards the projection 27c through a semicircular resilient deflecting portion 27b, and at a position closer to the free end than the locking recess 35 engaged by the bend 28 of the shutter 9, a recessed clearance 37 is formed to facilitate the passage of the bend 28 thereat after releasing the locking of the shutter 9.

Figure 6:
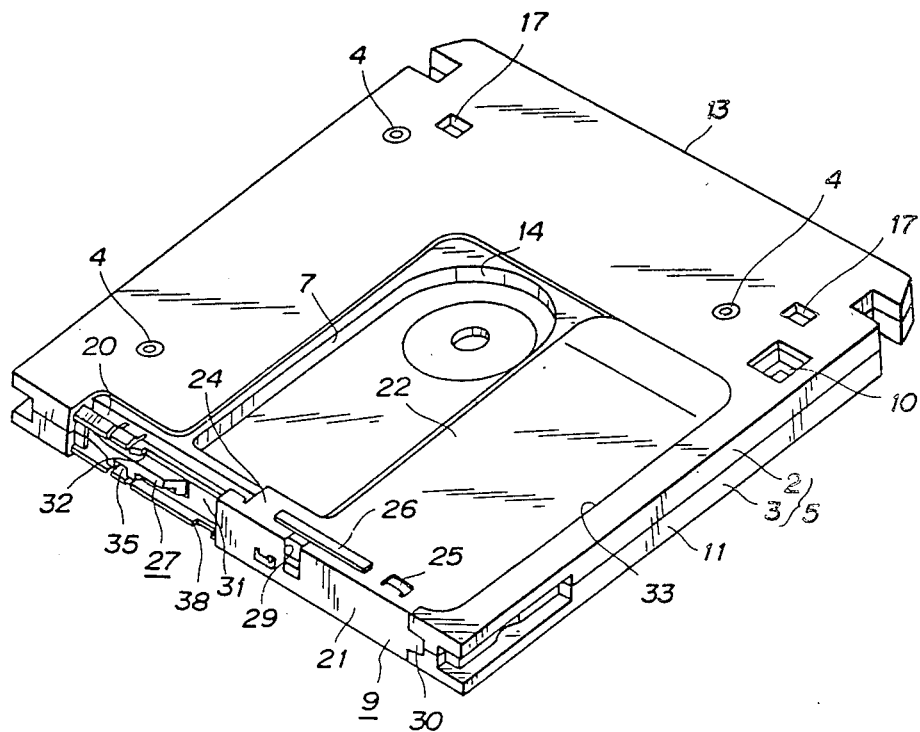
FIG. 6 is a perspective view showing the shutter of the disk cartridge being opened.

On the front wall section 12 of the cartridge 5, there is formed a recess 38 (see FIG. 6) formed as a cut-out 38 into which is intruded the shutter opening and closing pin of the shutter opening and closing arm that is not engaged in the engaging hole 29 of the shutter 9. This recess 38 is provided at a position in which the shutter opening and closing pin of one of a pair of shutter opening and closing arms that does not contribute to the operation of the shutter 9 is intruded when the disk cartridge 1 is introduced correctly and the shutter 9 has been opened by the other shutter opening and closing arm of the pair that is rotated by the disk cartridge 1. Thus, as shown in FIG. 6, the recess 38 is provided at a position of facing to the outside when the shutter 9 is actuated by the one shutter opening and closing arm and brought to a second position of opening the apertures 7, 8 and the disk table insertion openings 14, 15. The recess is formed by partially cutting the front side wall section 12 such that the shutter opening and closing pin of the shutter opening and closing arm is intruded therein in a direction orthogonal to the thickness direction of the disk cartridge 1, while the recess 38 is of such a depth that the shutter opening and closing pin when intruded therein does not project from the cartridge 5. This recess 38 is provided at a position transversely symmetrical with respect to the lateral side of the disk cartridge and the position of the engagement opening 29 of the shutter 9 when the shutter 9 is in the opened second position as indicated in FIG. 6.

Figure 7:
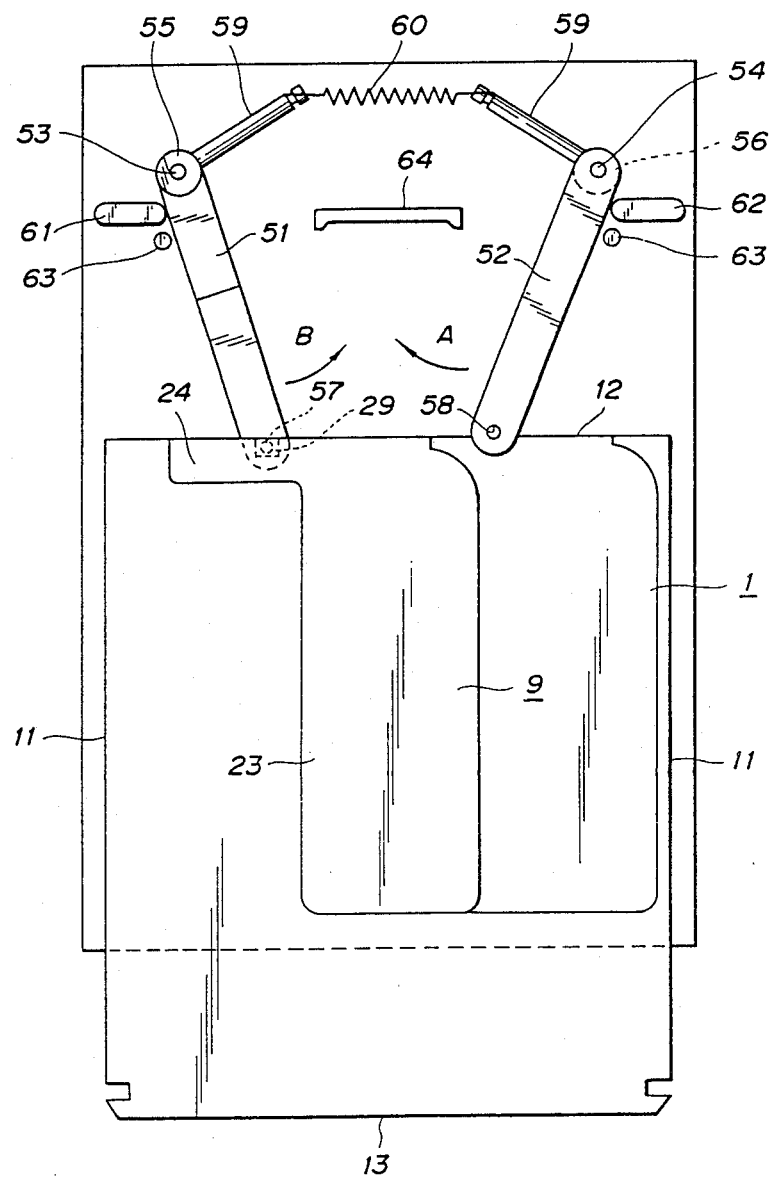
FIG. 7 is a plan view showing the disk cartridge inserted into the shutter opening and closing device.

STRUCTURE OF THE RECORDING AND/OR REPRODUCING APPARATUS (FIGS. 1, 7 and 8)

The structure of the recording and/or reproducing apparatus into which the above described disk cartridge 1 is inserted and attached is hereafter explained.

The recording and/or reproducing apparatus is provided with positioning pins, not shown, adapted to engage with reference apertures 17, 17 or 18, 18 provided to the disk cartridge 1 for determining the heightwise and horizontal attachment position of the disk cartridge 1, such that it is after horizontal and heightwise positioning has been made that the disk cartridge 1 is attached to the disk attachment unit 41. As shown in FIG. 1, the disk attachment unit 41 is provided with a disk rotation drive section 43 having a disk table 42 adapted to drive the disk 6 in the disk cartridge 1 into rotation and a chucking section, not shown, for chucking the disk to the disk table 42 so that the disk 6 will be driven into rotation as one and in timing with the disk table 42. There is also provided an optical pickup unit 44 disposed opposite to the lower surface of the disk cartridge 1 attached to the disk attachment unit 41, and caused to be moved radially between the inner and outer peripheries of the disk 6 to effect writing and reading of the information signals to and from the signal recording surface of the disk 6.

The disk attachment unit 41 provided within the apparatus is provided with a cartridge supporting frame 45 adapted to support the disk cartridge 1 inserted through a disk insertion and removal opening provided to an outer casing of the main body of the recording and/or reproducing apparatus. The cartridge supporting frame 45 is vertically movable mounted to a chassis provided in turn with the disk rotation drive unit 43, pickup unit 44 or other functional devices. The cartridge supporting frame 45 is formed as a flat plate having about the same width as the disk cartridge 1 and has on both sides thereof opposing cartridge supporting members 46, 47 each having a U-shaped cross section for receiving and supporting both sides of the disk cartridge 1. The front side of the cartridge supporting frame 45 is designed as an opening 48 for receiving the disk cartridge 1. The cartridge supporting frame 45 is supported with the opening 48 facing to the disk insertion and take-out opening during the insertion and removed of the disk cartridge 1. When the disk cartridge 1 is to be attached horizontally, the disk cartridge 1 is moved over the positioning pins and the disk rotation drive unit 43, while the disk cartridge is also movable vertically after the termination of such horizontal movement so that the disk cartridge 1 may be lowered to a position defined by the positioning pins.

On the inner side of the cartridge supporting frame 45 opposite to the reception opening 48 for the disk cartridge 1, there are provided a first shutter opening and closing arm 51 and a second shutter opening and closing arm 52/ in opposition to the direction of inserting the disk cartridge 1. These first and second arms 51, 52 are provided at the proximate ends with tubular shaft inserting portions 55, 56 adapted to receive supporting shafts into which supporting shafts 53 and 54 implanted on both inner sides of the cartridge supporting frame 45 are introduced. The arms 51, 52 are also provided at the distal ends with upright first and second shutter opening and closing pins 57, 58 adapted to selectively engage with the engaging hole 29 provided for the shutter 9 of the disk cartridge 1. The lengths from the shaft inserting portions 55, 56 to the first and second opening and closing pins 57, 58 are set so as to be equal to each other.

The supporting shafts 53, 54 are implanted transversely symmetrically about the center of rotation of the disk rotation drive unit 43 as a center, which center of rotation is the center of insertion of the disk cartridge 1. The first and second shutter opening and closing arms 51, 52 are rotatably mounted with the shaft inserting portions 55, 56 passed through the supporting shafts 53, 54 and with the first and second shutter opening and closing pins 57, 58 projecting in opposing directions. These first and second shutter opening and closing arms 51, 52 having the same lengths and mounted through supporting shafts 53, 54 symmetrical with respect to the center of insertion of the disk cartridge 1, are mounted symmetrically with the center of insertion of the disk cartridge 1 as the center.

The first and second shutter opening and closing arms 51, 52 are of such lengths that, when the arms are rotated in opposite directions about the supporting shafts 53, 54 as center, the first and second shutter opening and closing pins 57, 58 implanted on the ends thereof will overlap with each other in the course of turning of the arms 51, 52.

The first and second shutter opening and closing arms 51, 52 are mounted to the shafts 53, 54 with a larger heightwise interval than the thickness of the disk cartridge 1, such that, on insertion of the disk cartridge 1, the first and second shutter opening and closing pins 57, 58 will engage with the engaging hole 29 of the shutter 9 without the opening arms 51, 52 abutting on the disk cartridge 1.

The first and the second shutter opening and closing pins 57, 58 are formed with the lengths sufficient to engage with the engagement opening 29 provided for the shutter 9 of the disk cartridge 1 while the latter is introduced into the apparatus. These first and second shutter opening and closing pins 57, 58 are of such heights that, when these first and second shutter opening and closing arms 51, 52 are rotated simultaneously within the same plane of the disk cartridge 1, as shown in FIG. 8, the pins 57, 58 do not abut on each other at the point of intersection of the rotatory trajectories thereof.

The first and second shutter opening and closing arms 51, 52 are urged by a tension spring 60 installed between spring retainers 59, 59 projectedly mounted to the shaft inserting portions 55, 56 in a direction approximately orthogonal to the shutter opening and closing arms 51, 52. These arms are urged in a direction in which the shutter opening and closing pins 57, 58 are moved away from each other. The rotational position of the first shutter opening and closing arm 51 is controlled by a first arm control member 61 such that, when the disk cartridge 1 is introduced with the upper side thereof directing downwards and the first signal recording side of the disk 6 facing to the optical pickup unit 44, the first shutter opening and closing pin 57 implanted at the distal end of the arm 51 will be positioned opposite to the engaging hole 29 of the shutter 9. On the other hand, the rotational position of the second shutter opening and closing arm 52 is controlled by a second arm control member 62 such that, when the disk cartridge 1 is introduced with the signal recording side thereof facing to the optical pickup device, the second shutter opening and closing pin 58 implanted at the distal end thereof is positioned in a facing relation to the engagement opening 29 of the shutter 9. Towards the rear end of the cartridge supporting frame 45 and in proximity to the first and second arm control members 61, 62, there are implanted a pair of disk cartridge insertion control projections 63, 63 for controlling the position of insertion of the disk cartridge 1. As the disk cartridge 1 is introduced into abutment with the insertion control projections 63, 63, the shutter 9 is moved from the first position to the second position by the first and second shutter opening and closing arms 51, 52 for completely exposing the signal read-out or write apertures 7, 8.

Towards the inner side of the disk attachment section 41 opposite to the direction of insertion of the disk cartridge 1, there is provided a stopper 64 abutting on a second shutter opening or closing pin 58 or a first shutter opening or closing pin 57 to inhibit rotation of the first shutter opening and closing arm 51 and the second shutter opening and closing arm 52 to control attachment of the disk cartridge 1 to the prescribed inserting position when the second or first shutter opening and closing pins 58 or 57 provided to the shutter opening and closing arms 52 or 51 that is trusted into rotation by the inserted disk cartridge 1 and that does not contribute to the opening and closure of the shutter 9 is turned as it is projected on the front side wall section 12 or the rear side wall section 13 of the cartridge 5 without intruding into the recess 38 of the cartridge 5.

OPERATION OF OPENING BY THE SHUTTER 9 OF THE DISK CARTRIDGE

The operation of opening the shutter 9 by the shutter opening and closing device having the above described first shutter opening and closing arm 51 and second shutter opening and closing arm 52 will be hereafter described.

OPERATION OF OPENING BY THE SHUTTER WHEN THE DISK CARTRIDGE 1 IS INSERTED WITH THE FIRST SIDE OF THE DISK 6 FACING TO THE OPTICAL PICKUP DEVICE

(FIGS. 1, 7, 9 and 10)

As the disk cartridge 1 is inserted through the disk insertion and take-out opening with the upper side of the disk cartridge 1 directing upwards and the optical pickup device facing to the first signal recording surface of the disk 6, as shown in FIG. 1, the first shutter opening and closing pin 57 at the foremost part of the first shutter opening and closing arm 51 is engaged with the engaging hole 29 of the shutter 9. At this time, the first shutter opening and closing pin 57 abuts on the portion 27c of the locking member 27 provided within the cartridge 5 to shift the locking member 27 to disengage the bend 28 from the locking recess 35 of the locking member 27 to enable the sliding of the shutter 9.

Figure 10:
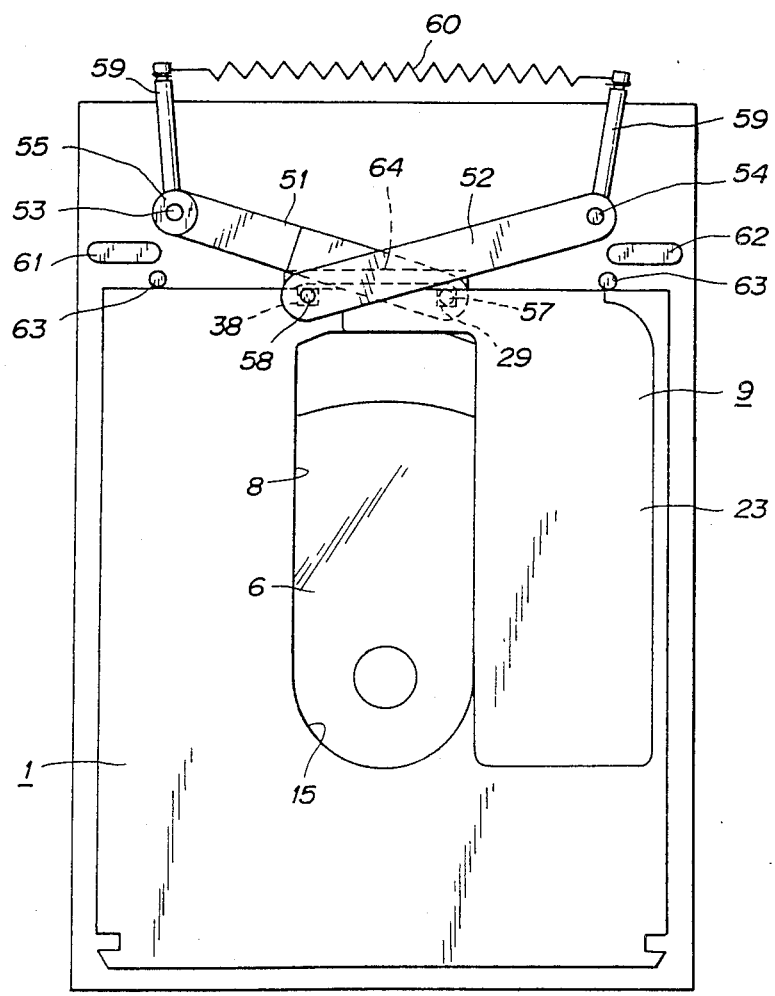
FIG. 10 is a plan view showing the shutter of the disk cartridge opened.

The second shutter opening and closing pin 58 at the foremost part of the second shutter opening and closing arm 52 starts to ride on an inclined guide member 30 provided to the other end of the shutter 9, such that the second shutter opening and closing arm 52 is turned in the direction of an arrow mark A in FIG. 7 against the action of the tension spring 60 in advance of turning of the first shutter opening and closing arm 51. That is, the second shutter opening and closing arm 52 is turned with a time lead corresponding to the engagement of the first shutter opening and closing pin 57 in the engaging hole 29. As the disk cartridge 1 is inserted further under this state, the first shutter opening and closing arm 51 starts to be turned in the direction of the arrow mark B in FIG. 7 under the thrusting by the disk cartridge 1 and against the urging of the tension spring 60. At this time, since the first shutter opening and closing pin 57 is engaged in the engaging hole 29 of the shutter 9, and the shutter 9 is unlocked, the shutter 9 is moved, with the rotation of the first shutter opening and closing arm 51, from the first position of closing the apertures 7 and 8 of the disk cartridge 1 and the disk table inserting openings 14 and 15 towards the second position of opening the apertures 7, 8 and the disk table inserting openings 14, 15. As the disk cartridge 1 is inserted further until abutment with the inserting control projections 63, 63, the shutter 9 is completely moved to the second position by the first shutter opening and closing arm 51 for exposing the apertures 7, 8 and the disk table inserting openings 14, 15, as shown in FIG. 10.

The second shutter opening and closing arm 52, turned in advance of turning of the first shutter opening and closing arm 51, is turned as the shutter opening and closing pin 58 is slid from the inclined guide section 30 of the shutter 9 of the front wall 21. As the shutter 9 is moved to the second position in which the shutter 9 has exposed the apertures 7, 8 and the disk table insertion openings 14, 15, the pin 50 of the arm 52 is intruded or introduced into the recess 38 of the cartridge 5 thus far covered by the shutter 9.

In this manner, when the disk cartridge 1 is inserted properly and the shutter 9 has completely opened the apertures 7, 8 and the disk table insertion openings 14, 15 the shutter opening and closing pin 58 of the second shutter opening and closing arm 52 that does not contribute to the operation of the shutter 9 is intruded into the recess 38 without abutting on the stopper 64. The disk cartridge 1 is inserted to a position abutting on insertion control projections 63, 63 and attached to the predetermined attachment position, after turning the first and second shutter opening and closing arms 51, 52.

As the disk cartridge 1 has been attached to the aforementioned attachment position, the cartridge supporting frame 45 supporting this disk cartridge 1 is lowered towards the disk rotation drive unit 43 and towards the pickup 44 for clamping the disk 6 on the disk table 42 to enable the turning of the disk 6.

OPERATION OF OPENING WHEN THE DISK CARTRIDGE 1 IS INSERTED WITH THE SECOND SURFACE OF THE DISK 6 FACING TO THE OPTICAL PICKUP UNIT

As the disk cartridge 1 is inserted with the lower side of the disk cartridge 1 directing downwards and with the second surface of the disk 6 facing to the optical pickup unit, the situation is the reverse of that in which the first surface of the disk 6 is facing to the optical pickup device, as described above. Thus the second shutter opening and closing pickup 58 at the foremost part of the second shutter opening and closing arm 52 engages with the engaging hole 29 of the shutter 9, the first shutter opening and closing pin 57 at the foremost part of the first shutter opening and closing arm 51 riding on the inclined guide section 30 formed at the other end of the shutter 9. The first shutter opening and closing arm 51 is turned against the action of the tension spring 60 in advance of turning of the second shutter opening and closing arm 52.

As the disk cartridge 1 is inserted until abutment with the insertion control projections 63, 63, the shutter 9 is moved to the second position by the second shutter opening and closing arm 52 so that the apertures 7, 8 and the disk table inserting openings 14, 15 are completely opened, the first shutter opening and closing arm 51 being turned while causing the shutter opening and closing pin 59 to slide from the inclined guide section 30 of the shutter 9 on the front wall 21 until it is intruded into the recess 38 thus far covered by the shutter 9.

The other operations are not described herein in detail since the operation of the first shutter opening and closing arm 51 and that of the second shutter opening and closing arm 52 are simply the reverse of those for the case of introducing the disk cartridge with the first surface of the disk 6 facing to the optical pickup device.

STATE OF NOT OPENING THE (SHUTTER OF THE DISK CARTRIDGE (FIG. 11)

When the insertion is made from the shutter 9 with the first or second surface of the disk 6 facing to the pickup device, and the first shutter opening and closing pin 57 at the end of the first shutter arm 51 or the second shutter opening and closing pin 58 at the end of the second shutter arm 52 is introduced into the interior of the disk attachment section 41 without engaging with the engaging hole 29 of the shutter 9, the shutter opening and closing arms 51, 52 will be turned with the shutter opening and closing pins 57, 58 riding on the front wall 21. The shutter opening or closing pin 57 or 58 of the other shutter opening or closing pin 51 or 52 that does not take part in the opening or closure of the shutter 9 is also unable to be intruded into the recess 38 since the shutter 9 is not opened, such that the shutter opening and closing pins 57, 58 abut on the stopper 64 before the disk cartridge 1 abuts on the insertion control projections 63, 63 to inhibit the attachment of the disk cartridge 1 to the prescribed insertion and attachment position while also inhibiting the intrusion into the side of the disk rotation drive unit 44 and inhibiting attachment of the disk 6 to the disk table 42.

Figure 11:
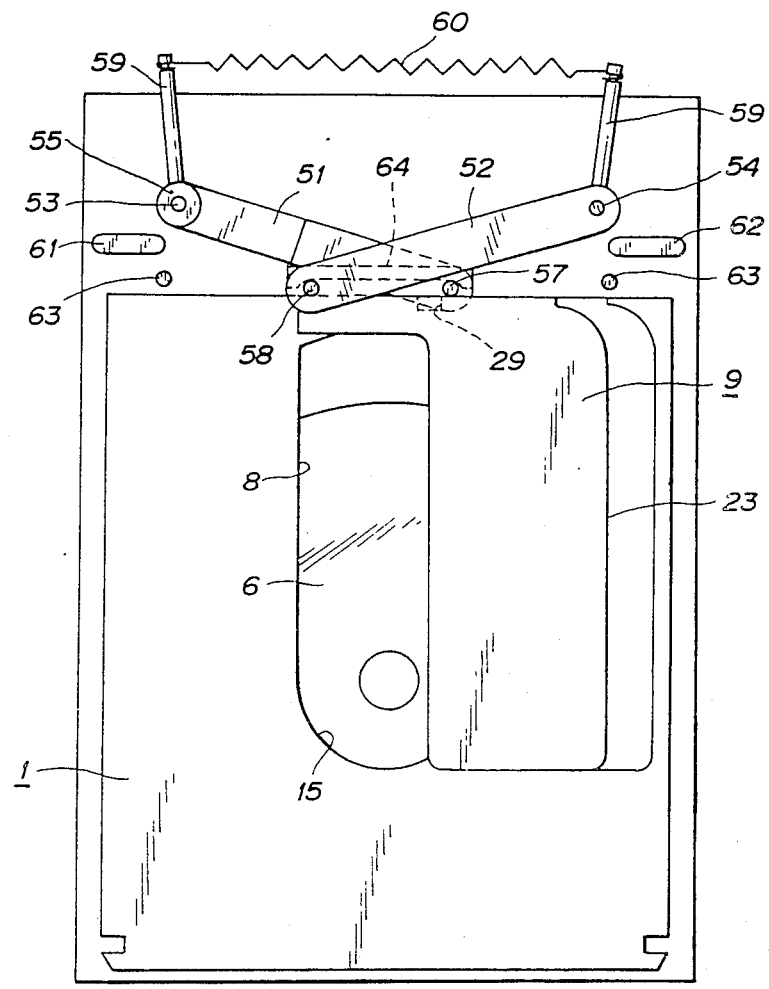
FIG. 11 is a plan view showing the shutter of the disk cartridge not completely opened.

Further, as the disk cartridge 1 is inserted from the side of the shutter 9, and introduced into the inside of the attachment section 41, with the first shutter opening and closing pin 57 at the foremost part of the first shutter opening and closing arm 51 or the second shutter opening and closing pin 58 at the foremost part of the second shutter opening and closing arm 52 then engaging with the engaging hole 29 of the shutter 9, the shutter 9 being moved towards a second position of opening the aperture 7, 8 and the disk table insertion openings 14, 15 of the disk cartridge 1, the shutter 9 being however not moved completely to said second position due for example to the shutter opening or closing pins 57 or 58 disengaging from the opening 29 on account of external vibrations, as shown in FIG. 11, the recess 38 provided to the front wall section 12 of the cartridge 5 is covered by a portion of the shutter 9, so that the shutter opening or closing pin 57 or 58 of the other shutter opening or closing arm 51 or 52 cannot be intruded into the recess 38. Thus the shutter opening or closing pin 57 or 58 abuts on the stopper 64 before the disk cartridge abuts on the control projections 63, 63 to inhibit attachment of the disk cartridge 1 at the prescribed insertion and attachment position while also inhibiting intrusion or descent towards the disk rotation drive unit 44 and attachment of the disk 6 to the disk table 42.

STATE OF MISTAKEN INSERTION OF THE DISK CARTRIDGE (FIG. 12)

Figure 12:
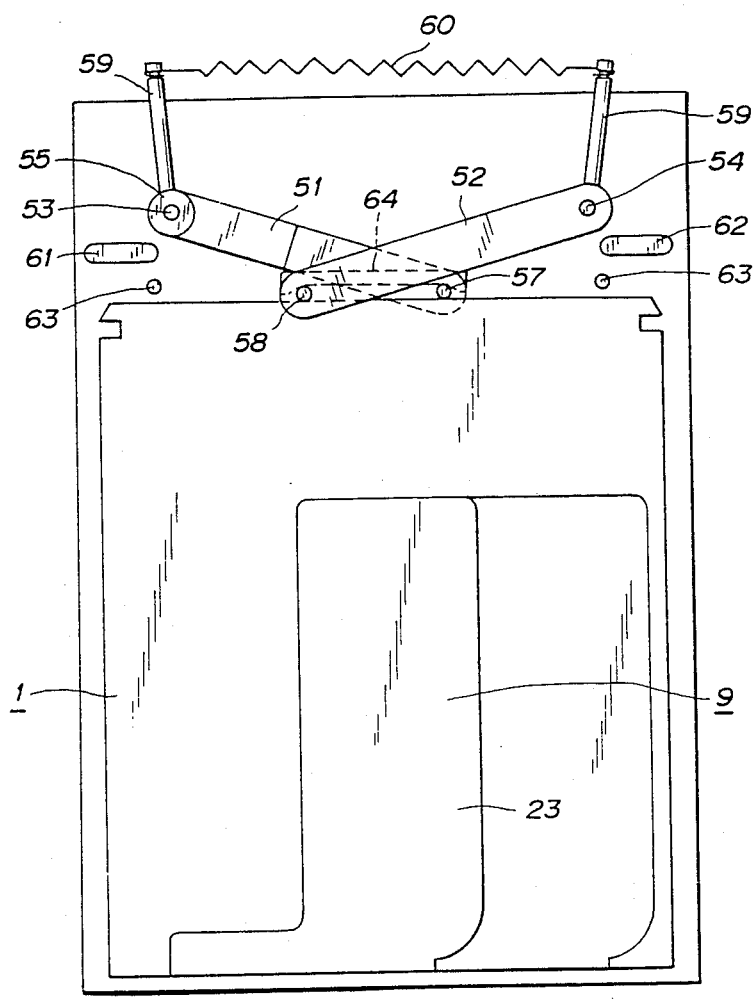
FIG. 12 is a plan view showing the disk cartridge inserted from the rear side.

When the disk cartridge 1 is not inserted from the side of the shutter but incorrectly inserted from the side of the rear side wall section 13 opposite to the attachment side of the shutter 9, the shutter 9 is inserted without any operation on the movable or functional parts thereof, so that the first and second shutter opening and closing arms 51, 52 continue to be turned with the first and second shutter opening and closing pins 57, 58 thereof riding and abutting on the flat rear side wall section 13 of the disk cartridge 1. Any of the shutter opening and closing pins 57, 58 of the shutter opening and closing pins 51, 52 cannot be intruded into the cartridge 5 but ride on and project from the flat rear side wall section 13 of the disk cartridge 1. As shown in FIG. 12, the shutter opening and closing pins 57, 58 abut on the stopper 64 before the disk cartridge 1 abuts on the insertion control projections 63, 63, thus inhibiting attachment of the disk cartridge 1 to the prescribed attachment position.

As a means of detecting the extent of rotation of the shutter opening and closing arms 51, 52 for determining the correct or incorrect insertion of the disk cartridge 1, other than that described in the foregoing embodiment, it is also possible to detect the angle of rotation of the other arm 51 or 52 by opto-electrical means, in which case the angle of rotation of the shutter opening or closing arm 51, 52 is to be detected by a photo interplanter or a photo reflector.

UTILIZATION FOR INDUSTRY

According to the present invention, one of the pair of shutter opening and closing arms is selected in accordance with which side of the double-side disk cartridge having a so-called one-side opening type shutter will face to the pickup device, the protuberance on the one arm is engaged with the engaging hole provided to the shutter opening and closing arm to cause the turning of the shutter opening and closing arm so as to cause the sliding of the shutter for exposing the apertures. When the disk cartridge is inserted normally and the pair of the shutter opening and closing arms are turned to the regular rotary position to cause the complete opening of the shutter, the protuberance provided to the other shutter opening and closing arm that does not contribute to the opening and closure of the shutter is intruded into the recess provided to the front wall section of the cartridge.. Conversely, when the disk cartridge is inserted incorrectly and the shutter opening is not performed at least completely, the protuberance on the other shutter opening and closing arm is prevented from intruding into the recess of the cartridge. In such manner, complete shutter opening may be detected by detecting the turning angle of the other shutter opening and closing arm. In the above embodiment, attachment of the disk cartridge to the predetermined attachment position in the recording and/or reproducing apparatus can be inhibited through detecting the mechanical abutment of the shutter opening and closing arm on the stopper to protect the disk cartridge positively or protect the pickup unit, disk rotation drive unit or disk chucking unit provided in the recording and/or reproducing apparatus.

I claim:

1. In a disk cartridge having an upper side connected by a lateral edge to a lower side, said cartridge having a shutter that may be slide along the lateral edge by a shutter opening and closing device between a first position for closing signal read-out or signal write apertures on the upper or lower side of the disk-containing cartridge and a second position for opening said apertures, the improvement comprising said opening and closing device having a first rotary arm and a second rotary arm, said shutter having a lateral side with an engaging hole for engagement with the first rotary arm of the shutter opening and closing device, said hole extending orthogonal to a direction of insertion for said disk cartridge, said first rotary arm being engaged in said opening and being turned by the movement of insertion of said disk cartridge to slide said shutter along the lateral edge of the cartridge from said first position to said second position to open said apertures, and a recess in the lateral edge of said cartridge at a position exposed by said shutter when moved to the second position, said recess receiving a portion of said second rotary arm as the cartridge moves to the inserted position and the shutter is in the second position.

2. In a disk cartridge according to claim 1, characterized in that signal read-out or signal write apertures are formed on both the upper and lower surfaces of the cartridge which accommodates a disk, said apertures on said upper and lower surfaces being adapted to be opened and closed by said shutter which has a U shape with a portion for each aperture.

3. In a disk cartridge according to claim 1, wherein when the shutter is in the second position, the engaging hole of the shutter is positioned transversely symmetrically to said recess with respect to the direction of insertion.

4. In a disk cartridge according to claim 1, wherein each aperture includes a portion forming a disk table inserting opening for rotationally driving a disk of the cartridge.

5. In a disk having a cartridge housing containing a disk, said housing having an upper side connected to a lower side along one edge by a lateral edge surface, each side having an aperture for reading signals from the disk in the cartridge, said shutter having a U shape and being slidable along said edge surface between a first position for closing said apertures to a second positions opening said apertures and a device for opening and closing said shutters, the improvements comprising said device having a first rotary arm, a second roatry arm and a stopper, said shutter having a lateral side overlying a portion of the lateral surface of the cartridge and having an engagement opening for receiving a portion of the first rotary arm as the cartridge is moved in the insertion direction, said portion of the first rotary arm being engaged in said opening and turning the arm during the insertion of the cartridge to cause movement of the shutter from the first position to the second position to open said apertures, said lateral edge surface of the cartridge having a recess positioned on said edge surface to be covered by the lateral side when the shutter is in said first position, said recess being exposed for receiving a pin portion of the second rotary arm when the shutter is in said second position, and said stopper being positioned in said device to limit the rotation of the second rotary arm so that if the shutter is not moved to the second position during insertion of the cartridge, said second rotary arm is prevented from turning beyond a given position and prevents the complete movement of the cartridge into an inserted position.

6. In a disk cartridge according to claim 5, wherein the lateral side of the shutter is provided with an inclined guide section for engaging the pin portion of the second rotary arm during the initial insertion of the cartridge.

7. In a disk cartridge according to claim 5, wherein the device includes a spring acting on the first and second rotary arms to urge the first and second arms in a direction to return the shutter to said first position.

8. In a disk cartridge according to claim 7, wherein each of said arms adjacent a pivot point of said rotary arm has a lever portion and said spring extends between said lever portions.

* * * * *